United States Patent [19]

Cho et al.

[11] Patent Number: 4,576,458

[45] Date of Patent: Mar. 18, 1986

[54] CAMERA FINDER EMPLOYING HOLOGRAPHIC VIEW FIELD FRAMES

[75] Inventors: Michio Cho, Tokyo; Masane Suzuki; Takayuki Saito, both of Oomiya, all of Japan

[73] Assignee: Fuji Photo Film Co., Ltd., Kanagawa, Japan

[21] Appl. No.: 596,196

[22] Filed: Apr. 2, 1984

[30] Foreign Application Priority Data

Apr. 5, 1983 [JP] Japan .................................. 58-59728
Dec. 1, 1983 [JP] Japan ................................. 58-227542

[51] Int. Cl.[4] ........................ G03B 13/12; G03B 13/14
[52] U.S. Cl. ..................................... 354/199; 354/221; 354/222; 354/466; 350/3.73
[58] Field of Search ............... 354/199, 200, 201, 219, 354/221, 222, 224, 225, 466; 350/3.7, 3.72, 3.73

[56] References Cited

U.S. PATENT DOCUMENTS 3,641,900 2/1972 Ataka et al. ........................... 354/199
4,165,930 8/1979 Matsumoto et al. ................. 354/466
4,294,529 10/1981 Sato et al. ............................ 354/466
4,374,612 2/1983 Matsumura et al. ................ 354/466
4,478,493 10/1984 Yokota ................................. 354/222

Primary Examiner—A. A. Mathews
Attorney, Agent, or Firm—Sughrue, Mion, Zinn, Macpeak, and Seas

[57] ABSTRACT

A camera finder capable of indicating a view field frame for determining the range of photographing and a target mark for showing a desired focus adjusting portion. Interposed between an objective lens and an eye lens in this finder are holograms having recorded thereon view field frames and a target mark. The hologram is irradiated by a reference beam or beams, whereby the view field frame and the target mark are regenerated. In the hologram, there are recorded a first view field frame in which a parallax is corrected in the long-medium distance and a second view field frame in which a parallax is corrected in the short distance. A beam source for regenerating each view field frame is selected in accordance with an object distance, whereby a view field frame corresponding to the object distance is regenerated. The parallax can be corrected as described above.

18 Claims, 32 Drawing Figures

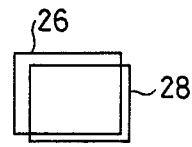
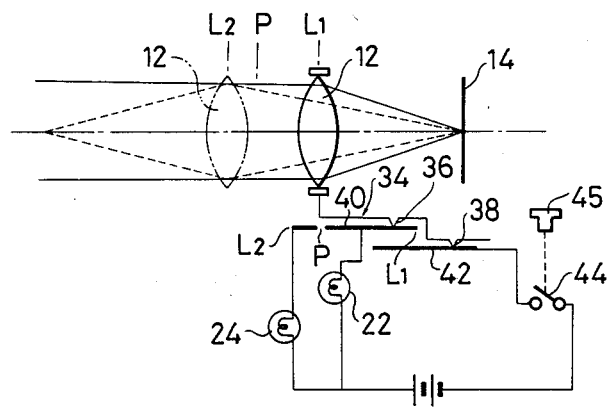
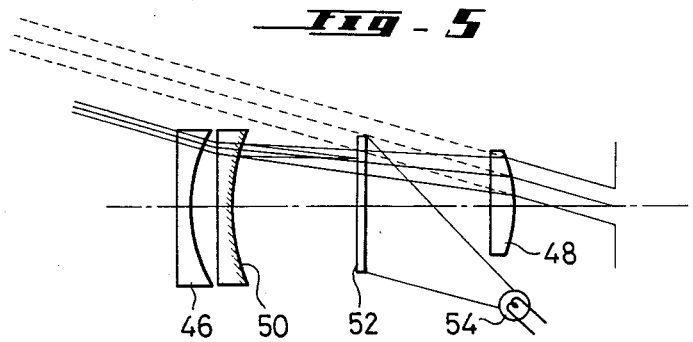

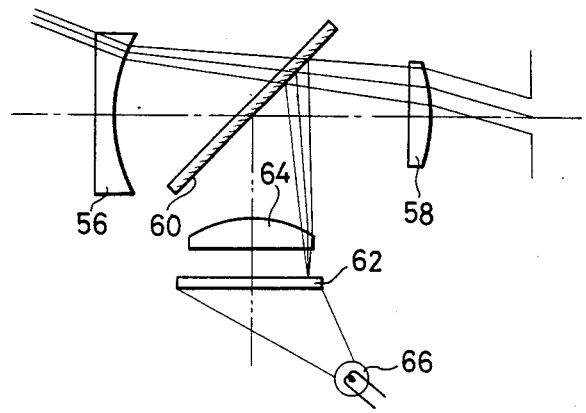
_Fig-6_
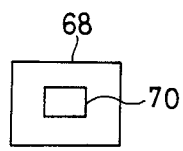
_Fig-7_
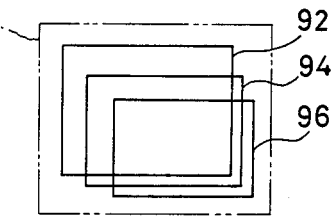
_Fig-9_
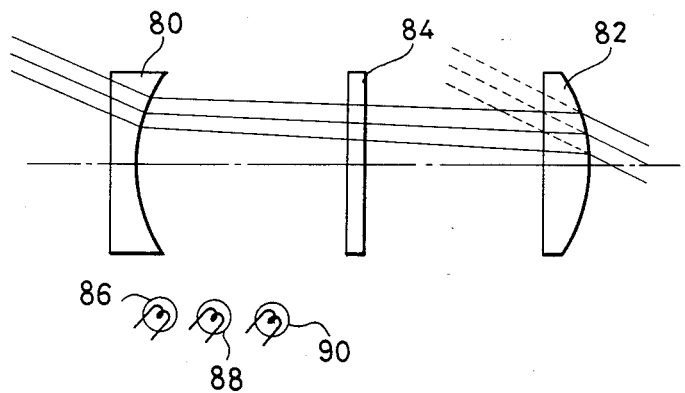
_Fig-8_

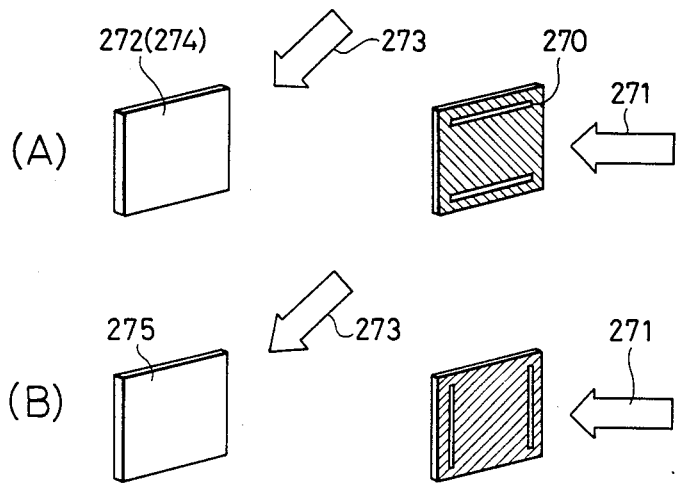
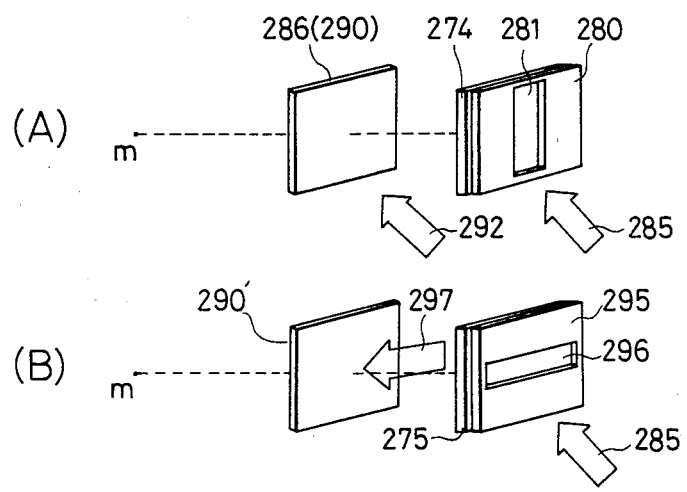

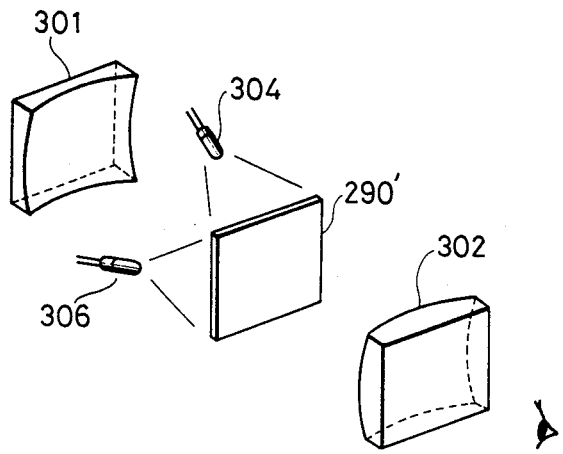
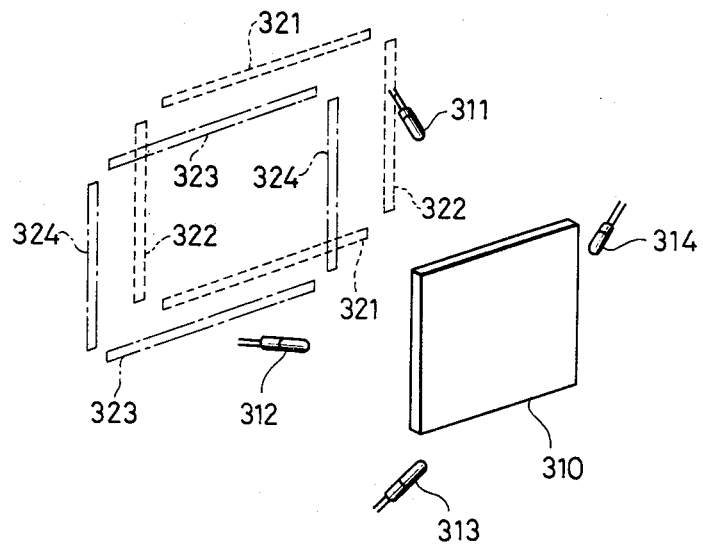

4,576,458

CAMERA FINDER EMPLOYING HOLOGRAPHIC VIEW FIELD FRAMES

BACKGROUND OF THE INVENTION

1. Field of the Invention

This invention relates to camera finder, and more particularly to a camera finder in which a hologram or holograms are used.

2. Description of the Prior Art

In a camera finder, a view field frame or frames for determining the range of photographing are provided, and in a camera finder of an automatic focusing camera, a target mark for showing a desired focus adjusting portion of an object is provided. The view field frame or frames, and the target mark are formed by applying silver deposition to a transparent glass plate interposed between an objective lens and an eye lens, or by making transparent only the portions of the view field frame and target mark on an opaque plate. In consequence, there have heretofore been such disadvantages that the construction of the finder is complicated by the provisions of a device for switching the view field frames for the parallax correction, a device for erasing the target mark and devices for various warnings given by on-off operating the view field frame or target mark.

SUMMARY OF THE INVENTION

The present invention has as its object the provision of a camera finder capable of optically indicating the view field frame and a target mark without applying silver deposition to the transparent glass plate, or making transparent only the portions of the view field frame and target mark on the opaque plate.

To achieve the above-described object, the present invention contemplates that the view field frame or frames and the target mark are recorded on holograms and these holograms are irradiated by a reference beam or beams, so that the view field frame and the target mark can be regenerated and indicated.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 3 is an explanatory view showing the view field frames;

FIG. 4 is an explanatory view showing the device for switching the view field frames in this embodiment;

FIG. 5 is a side view of an embodiment in which the present invention is applied to an Albada finder;

FIG. 6 is a side view of an embodiment in which the present invention is applied to a Mark finder;

FIG. 7 is an explanatory view showing the view field frame for an interchangeable lens;

FIGS. 8 through 11 are drawings showing an embodiment of the parallax correction in an automatic focusing camera, FIG. 8 being an arrangement diagram showing the outline of the Inverted Galilean finder, to which this embodiment is applied, FIG. 9 being an explanatory view showing the view field frames according to this embodiment, FIG. 10 being a flow chart showing an example of the control in this embodiment and FIG. 11 being a circuit diagram showing this embodiment;

FIGS. 20 through 26 are drawings showing an embodiment in which a view field frame regenerated by a hologram is prevented from being blurred, FIGS. 20 and 21 being explanatory views showing the view field frames having generated therein blurs, FIG. 22 being an explanatory view illustrating the reason for the generated blurs in a view field frame when the view field frame recorded in a rainbow hologram is regenerated, FIGS. 23 and 24 being explanatory views explaining the technique of forming the rainbow hologram used in the present invention, FIGS. 23A and 23B illustrating the technique of forming a lateral line master hologram and a vertical line master hologram, respectively, FIGS. 24A and 24B being arrangement diagrams of the finder optical system, in which the rainbow hologram is used, FIG. 25 being a perspective view showing the theoretical arrangement of the finder optical system, to which the present invention is applied, and FIG. 26 being an explanatory view showing the conditions of regeneration of an image of a hologram according to another embodiment of the present invention;

FIG. 29 is a drawing of the regeneration of the view field frame and the target mark and FIG. 30 being a circuit diagram showing an embodiment of the present invention.

DETAILED DESCRIPTION OF THE INVENTION

Description will hereunder be given of the preferred embodiments of a camera finder according to the present invention with reference to the accompanying drawings. FIGS. 1 through 7 describe one embodiment according to the present invention by taking a parallax correction.

Figure 1:
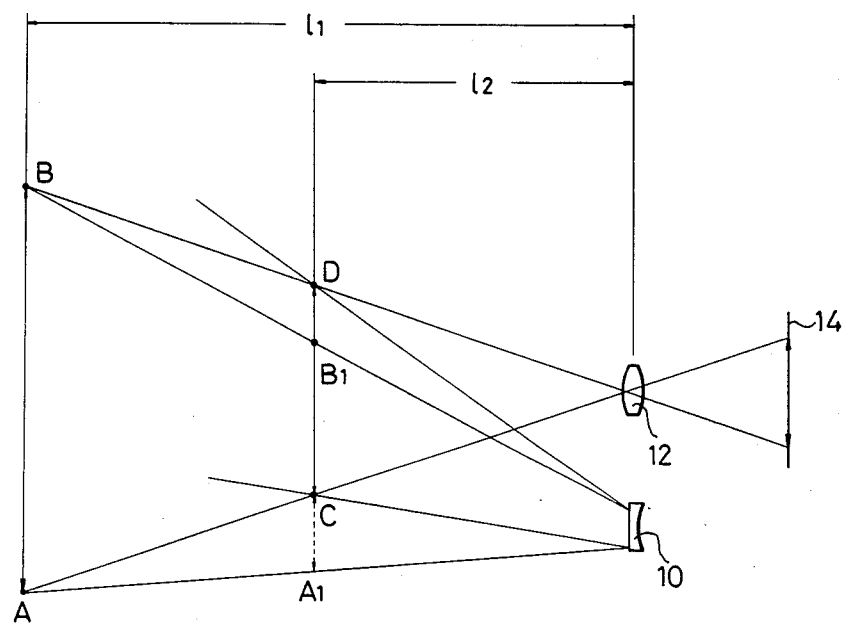
FIG. 1 is an explanatory view explaining the parallax.

As shown in FIG. 1, when optical axes of a finder 10 and a taking lens 12 are shifted from each other, a parallax is generated as described above. When an object located at a distance $l_2$ is taken by use of a view field frame in which a parallax is corrected at a distance $l_1$, due to the parallax a portion $A_1$-C is observed in the view field frame of the finder, but, not photographed on a film 14. On the contrary, a portion $B_1$-D is not observed in the view field frame of the finder 10, but is photographed. In order to obviate this disadvantage, it is necessary to continuously change the view field frame in the finder in accordance with the object distance or to provide a view field frame permitting observation of a range C-D at the distance $l_2$ when the distance $l_2$ is selected, separately of the view field frame at the distance $l_1$. To be strict, numerous view field frames should be prepared in accordance with the object distances when a plurality of view field frames are provided. However, the numerous view field frames can be substituted by the plurality of view field frames in practical use. Since, in this case, a plurality of view field frames are simultaneously observed in the finder, it is cumbersome. In consequence, it is preferable that only a necessary view field frame appears in the finder. In this embodiment, to simplify the explanation, two view field frames are adopted and description will be given of a case where these view field frames are changed over in accordance with the object distance.

Figure 2:
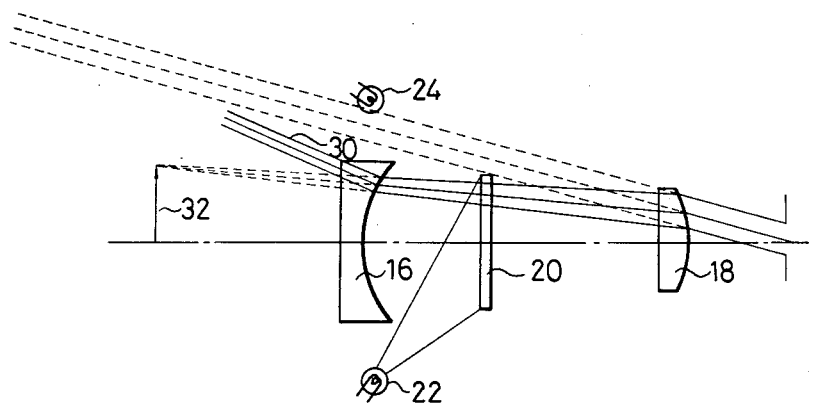
FIG. 2 is a side view of an embodiment in which the present invention is applied to an Inverted Galilean finder.

FIG. 2 shows one embodiment in which an inverted Galilean finder is constituted by a camera finder according to the present invention. In FIG. 2, designated at 16 is an objective lens costituting a finder optical system, 18 an eye lens, 20 a hologram interposed between the object lens 16 and the eye lens 18 and having thereon multiple-recorded two view field frames, and 22 and 24 are reference beam sources for irradiating beams to the hologram 20. View field frames 26 and 28 are multiple-recorded on the hologram 20 so that, as shown in FIG. 3, the view field frame 26 for which the parallax is corrected at a certain long distance and the view field frame 28 for which the parallax is corrected at a certain short distance can be regenerated by the reference beam sources, respectively.

When rays 30 from the object incident to the object lens 16 as shown in FIG. 2 are observed through the eye lens 18, a virtual image of the object is formed at a predetermined distance (for example, at about one meter from the finder). On the other hand, when it is supposed that an image of a point 0 is recorded on the hologram 20, when a beam emitted from any one of the reference beam sources 22 and 24 is irradiated to the hologram 20, the reference beam is diffracted by the hologram 20, whereby a spherical wave is generated by the hologram 20. This wavefront becomes a wavefront identical with when a point beam source is positioned at the point 0, and it is observed as if the point beam source is positioned at the point 0. If it is supposed that the view field frame is a collective body of points 0, then the wavefront generated by the hologram 20 becomes a wavefront in which numerous spherical waves generated by numerous points 0 are composed. When this wavefront is observed through the eye lens 18, a virtual image of the view field frame is formed at substantially the same position as a position of the virtual image of the aforesaid object on the optical axis. In consequence, it is necessary to record an image of a view field frame at a position spaced a predetermined distance from the surface of the hologram so that, when a virtual image 32 of the view field frame generated by the hologram 20 is observed through the eye lens 18, the view field frame can be formed at the substantially same position as a position of the virtual image of the object on the optical axis of the finder.

The exchange of the view field frames 26 and 28 is performed such that some distance signal is given from the camera at the time of photographing and either the reference beam source 22 or 24 is selected in accordance with the distance thus given. For example, in FIG. 4, there is disclosed a device for exchanging the reference beam sources 22 and 24 in associated operation with the object distance. A slidable member 34 is operationally associated with the movement of a distance ring including the lens 12, and is formed with contact elements 36 and 38. The contact element 36 comes into contact with an electric conductor 40, while the contact element 38 comes into contact with an electric conductor 42. The electric conductor 40 is discontinuous at a point P. In consequence, the contact element 36 turns on the reference beam source 22 when interposed between $L_1$ and P, and turns on the reference beam source 24 when interposed between $L_2$ and P. The point P, being a switching point interposed between $L_1$ and $L_2$, is provided at a position where a parallax value generated by the view field frame 26 becomes equal to a parallax value generated by the view field frame 28 for example.

In a view field frame exchange device shown in FIG. 4, after the focusing operation of the camera is completed, if a shutter button 45 of the camera is touched or half-pressed, then a switch 44 is closed. By this operation, the beam source 22 is turned on to regenerate the view field frame 26 when the lens is interposed between $L_1$ and P, while the beam source 24 is turned on to regenerate the view field frame 28 when the lens 12 is interposed between $L_2$ and P. The parallax is corrected as described above. In consequence, the range of photographing can be determined on the basis of the view field frame in which the parallax has been corrected.

It is necessary for the hologram 20 used in the inverted Galilean finder to regenerate an image at a position separate of the surface of the hologram, and hence, a Fresnel hologram, a rainbow hologram and the like other than the image hologram are preferable. When the Fresnel hologram is used, a coherent reference beam such as a semiconductor laser is used. When the rainbow hologram is used, an incoherent reference beam such as an incandescent lamp can be used.

FIG. 5 shows an embodiment in which an Albada finder is constituted by the view field frame changing device according to the present invention. In FIG. 5, designated at 46 is an objective lens, 48 an eye lens, 50 a half mirror, 52 a hologram in which a plurality of view field frames corresponding to object distances are multiple-recorded, and 54 reference beams (only one reference beam is shown). When the hologram 52 is irradiated by the reference beam source 54, a view field frame to be indicated, which corresponds to the object distance, is regenerated. This view field frame is reflected by the half mirror 50 and enters the eye piece 48. A virtual image on the view field frame is formed by the eye lens 48 at substantially the same position as a position of a virtual image on the optical axis. The exchange of the view field frames can be performed in associated operation with the distance ring in the same manner as in the above embodiment. The holograms to be used include the image hologram in addition to the rainbow hologram and the Fresnel hologram.

FIG. 6 shows the third embodiment in which a Mark finder is constituted by the view field frame changing device according to the present invention. In FIG. 6, designated at 56 an objective lens, 58 an eye lens, 60 a half mirror obliquely provided, 62 a hologram in which a plurality of view field frames corresponding to object distances are multiple-recorded, 64 a lens for making the Dioptric power meet the hologram 62 through the eye lens 58, and 66 reference beams (only one reference beam is shown). In this embodiment, in the same manner as in the above embodiments, the view field frame is regenerated in accordance with the object distance, and this view field frame can be formed in the vicinity of the position of the virtual image of the object. Since, in the Mark finder, a lighting window is provided in front of the camera in general, a mirror separate of the half mirror 60 in the light path of the finder is required. However, when the hologram is used as in this embodiment, no lighting window is required, so that only one mirror will do. In this embodiment, no restriction is imposed on the types of holograms in the same manner as in the embodiment of FIG. 5.

In addition, the following table shows the types of holograms and the beam sources which are usable for these holograms in the preceding embodiments.

TABLE

|  | Beam source | | |
| --- | --- | --- | --- |
|  | White beam | Monochromatic beam (incoherent) | Monochromatic beam (coherent) |
| Fresnel hologram | x (Unseen) | x (Image blurred) | o |
| Rainbow hologram | o | x | x |
| Image hologram | o | o | o | o Beam sources usable
x Beam sources not usable

In the preceding embodiments, the parallax correction has been described, however, the view field frame can be changed over at the time of lens exchange. More specifically, the view field frames corresponding to focal lengths of lenses for exchange such as example as a view field frame 68 for a wide angle lens shown in FIG. 7 and a view field frame 70 for a telephoto lens are previously multiple-recorded on the hologram, a necessary reference beam is selected at the time of lens exchange, and a view field frame meeting the object distance of the lens can be regenerated.

In the preceding embodiments, a plurality of view field frames are multiple-recorded on one hologram, however, a plurality of holograms may be used on each of which a view field frame is recorded.

It is necessary to irradiate reference beams equal in number to the view field frames recorded to the hologram. In this case, the reference beams as many as the view field frames should not necessarily be needed, but, the reference beams as many as the view field frames may be changed in direction. In consequence, even if only one beam source is used, this beam source is substantially moved, so that the directions of the reference beam as many as the view field frames may be changed.

Furthermore, when the rainbow hologram is used, if a regenerated image is to be obtained in a stereoscopic image, the irradiating direction to the hologram is restricted by a condition of the preparing the hologram, e.g. in the vertical direction. However, a planar image is sufficient for the view field frame, whereby the irradiating direction to the hologram need not necessarily be limited to the vertical direction, but, the lateral direction may be used.

As has been described hereinabove, with the camera finder according to the present invention, a hologram having thereon recorded at least two view field frames is provided in the finder optical system, and a reference beam is selected in accordance with the object distance and the focal length of the lens for exchange to form a view field frame meeting the object distance and the focal length, so that a view field frame having no shift from the surface of photographing can be obtained. Furthermore, the view field frame is regenerated by the hologram by changing the direction of the reference beam, any movable member is not needed as in the conventional finder or any complicated movable member is not needed as in the conventional finder, so that the view field frame changing arrangement of the finder can be simplified. According to the present invention, the view field frame changing of the finder is applicable to any type of finder, i.e. applicable not only to the cameras for business use and cameras for special applications but also to the cameras for amateurs commonly used. Moreover, according to the present invention, a clear view field frame can be always observed irrespective of the extent of lightness therearound.

FIGS. 8 through 11 show an example in which the camera finder according to the present invention is applied to the parallax correction of an automatic focusing camera.

FIG. 8 shows an example of a finder optical system, in which designated at 80 is an objective lens constituting the finder optical system, 82 an eye lens, 84 a hologram interposed between the objective lens 80 and the eye lens 82 and having thereon multiple-recorded three view field frames, and 86, 88 and 90 beam sources for irradiating reference beams to the hologram. In the hologram 80, view field frames are multiple-recorded in such a manner that a view field frame 92 in which the parallax is corrected at a distance on the side of a long distance, a view field frame 94 in which the parallax is corrected at a distance on the side of a medium distance and a view field frame 96 in which the parallax is corrected at a distance on the side of a short distance, as shown in FIG. 9 are regenerated by the beam sources 86, 88 and 90, respectively.

The finder optical system shown in FIG. 8 is designed such that a virtual image of the object is formed at a position spaced one meter apart from the finder forwardly thereof for example. Furthermore, the view field frames are previously recorded on the surface of the hologram 84 so that, when a beam is emitted from any one of the beam sources 86, 88 and 90, a virtual image of a view field frame may be formed at the substantially same position as a virtual image of the object on the optical axis of the finder.

Figure 10:
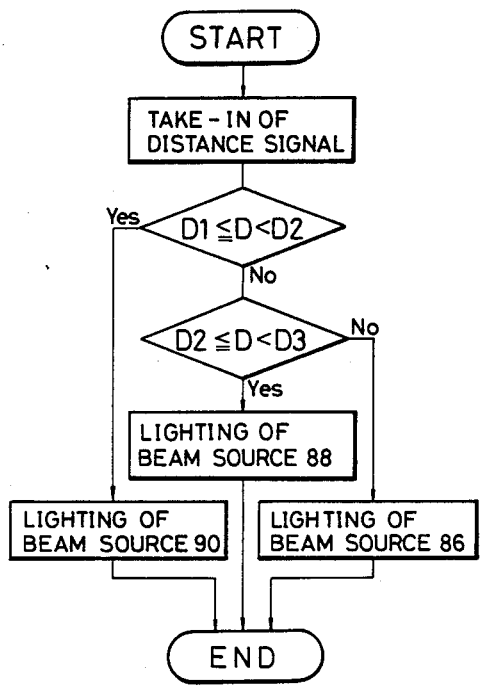

The change-over of the view field frames 92, 94 and 96 to one another is performed such that a distance signal from a sensor of an automatic focusing camera is converted into an electric signal and the electric signal thus obtained is compared with a reference voltage predetermined in accordance with distances corresponding to the respective view field frames, whereby a beam source to be turned on is selected. FIG. 10 shows an example of the processing.

Firstly, in an automatic focusing camera, a measured distance signal obtainable froma sensor, module or the like (or, a signal obtained such that an extension value of a lens is converted into a resistance value, which in turn is converted into a current value or a voltage value) is taken in, and a voltage corresponding to the measured distance is compared with a voltage predetermined in accordance with the object distance zone, whereby the beam source to be turned on is determined.

More specifically the respective voltages are determined in accordance with the distance as follows:

The actual object distance D: Voltage v
A first zone D1~D2 (short distance): Reference voltages V1~V2
A second zone D2~D3 (Medium distance): Reference voltages V2~V3
A third zone D3 or more (Long distance): Reference voltages V3 or more.

Then, in the short distance zone where the requirement of $D1 \leq D < D2$ ($V1 \leq v < V2$) is satisfied, the beam source 90 is turned on to regenerate the view field frame 96, in the medium distance zone where the requirement of $D2 \leq D < D3$ ($V2 \leq v < V3$) is satisfied, the beam source 88 is turned on to regenerate the view field frame 94, in the long distance zone where the requirement of $D3 \leq D$ ($V3 \leq v$) is satisfied, the beam source 86 is turned on to regenerate the view field frame 92. As described above, the view field frames can be successively regenerated in accordance with the respective distance zones, so that the parallax corrections can be effected without using a mechanically movable construction.

Figure 11:
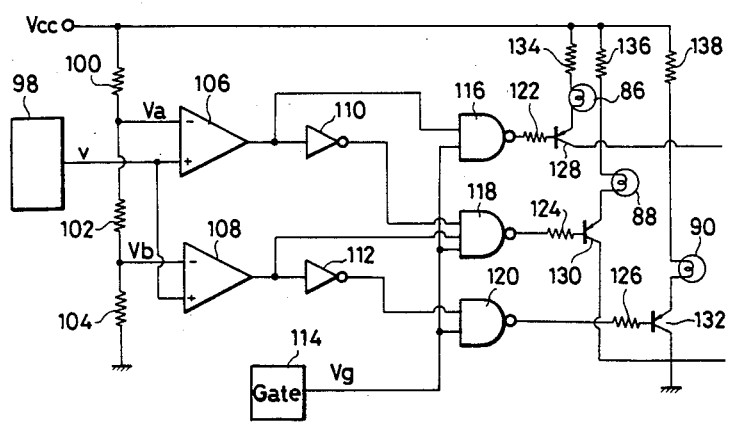

FIG. 11 shows an embodiment of the present invention in which the content of the processing of FIG. 10 is carried out.

In FIG. 11, designated at 98 is a distance signal generating portion of an automatic focusing camera, for outputting the voltage v corresponding to the object distance; 100, 102 and 104 voltage dividing resistors for dividing a source voltage Vcc to generate a reference voltage; 106 a comparator in which the voltage v from the distance signal generating portion 98 is compared with a voltage Va, which has been divided, and, when v>Va, an output voltage of a high level is generated; and 108 a comparator in which the voltage v is compared with a voltage Vb, which has been divided, and, when v>Vb, an output voltage of a high level is generated. Further, 110 and 112 are inverters for inverting output signals from the comparator 106 and 108 and outputting same; 114 a gate circuit for generating a gate voltage Vg for a pedetermined period of time at a pedetermined time; 116 a NAND circuit in which, only when both the gate voltage Vg and the output from the comparator 106 are on high level, an output of low level is generated; 118 a NAND circuit in which, only when any two outputs from the inverter 110, the comparator 108 and the gate circuit 114 are on high level, an output of a low level is generated; and 120 a NAND circuit in which, when the both outputs from the inverter 112 and the gate signal generating circuit 114 are on high level, an output of a low level is generated. Output terminals of the NAND circuits 116, 118 and 120 are connected to current-limiting resistors 122, 124 and 126, respectively.

Designated at 128, 130 and 132 are transistors, bases of which are connected to resistors 122, 124 and 126, respectively, emitters of which are connected to beam sources 86, 88 and 90 and collectors of which are commonly grounded. Further, current-limiting resistors 134, 136 and 138 are connected in series to the beam sources 86, 88 and 90, respectively.

In the above-described arrangement, if it is supposed that the voltage v is increased in proportion to an object distance d, then, in the short distance zone, the voltage v is lower in value than the both reference voltages Va and Vb (v<Vb<Va), and output voltages from the comparators 106 and 108 are on low level. However, when the comparators 106 and 108 are on low level, the inverters 110 and 112 are on high level, only the NAND circuit 120 is caused to fulfill the NAND condition by the output voltage from the inverter 112 and the gate voltage Vg, the output from the NAND circuit 120 comes to be on low level, and the transistor 132 is turned on, and a load current is caused to flow to turn on the beam source 90, whereby the view field frame 96 for the short distance is regenerated.

In the medium distance zone where the voltage v exceeds the reference voltage Vb (Vb<v<Va), only the comparator 108 outputs a voltage on high level, the inverter 110 still outputs a voltage on low level because of non-operation of the comparator 106, only the NAND circuit 118 is caused to fulfill the NAND condition by the aforesaid output voltages and the voltage Vg, the output from the NAND circuit 118 comes to be on low level, and the transistor 130 is turned on to light the lamp 88, whereby the view field frame 94 for the medium distance is regenerated.

Further, in the long distance zone where the voltage v exceeds the reference voltages Va and Vb (v>Va>Vb), both the comparators 106 and 108 output voltages on the high level, both the inverters 110 and 112 output voltages on low level, only the NAND circuit 116 is caused to fulfill the NAND condition, the output from the NAND circuit 116 comes to be on low level, and the transistor 128 is turned on to turn on the beam source 86, whereby the view field frame 92 for the long distance zone is regenerated.

In the embodiment shown in FIG. 11, an example has been shown in which circuits for special use are composed to discriminate the beam source to be turned on, however, the present invention may be achieved by composing the flow shown in FIG. 10 by use of software through a computer.

Additionally, in the preceding embodiment, three view field frames have been generated, however, any desirable number of view field frames may be regenerated as necessary.

As has been apparent from the foregoing, in the camera finder applied to an automatic focusing camera according to the present invention, a plurality of view field frames are recorded on a hologram in the finder in accordance with the object distance, any one of beam sources for regenerating the view field frame is automatically selected from the measured distance signals in accordance with the object distance, whereby the view field frame, in which the parallax is corrected, is regenerated, so that view field frame changing can be effected by a simplified arrangement with no movable member included.

FIGS. 12 through 15 describe an example in which the lightness of the view field frame is varied in accordance with the lightness of the object by use of the camera finder according to the present invention.

Figure 12:
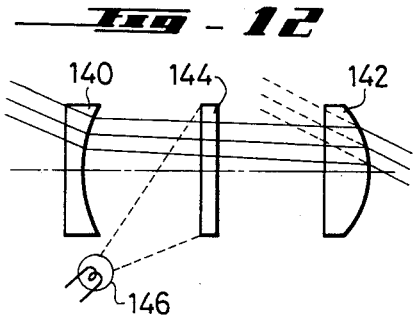
FIGS. 12 through 15 are drawings showing an embodiment in which the brightness of the view field frame is varied in accordance with the brightness of an object, FIG. 12 being an explanatory view showing the outline of the Inverted Galilean finder according to this embodiment, FIG. 13 being an explanatory view showing the view field frame according to this embodiment, FIG. 14 being a flow chart showing an example of the control in this embodiment, and FIG. 15 being a circuit diagram showing this embodiment.
Figure 13:
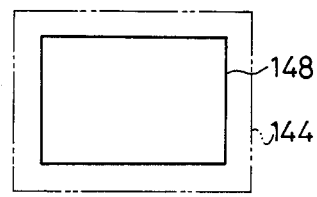

FIG. 12 shows an example of the finder using a hologram, in which reference numeral 140 is an objective lens constituting a finder optical system, 142 an eye lens, 144 a hologram interposed between the objective lens 140 and the eye lens 142 and having thereon recorded view field frames, and 146 a lamp as being a reference beam source for being turned on during operation of a shutter button to irradiate a beam to the hologram. On the hologram, the view field frame is recorded as shown in FIG. 13, and, when the hologram is irradiated from a predetermined angle by the reference beam source 146, the view field frame 148 is regenerated.

Figure 14:
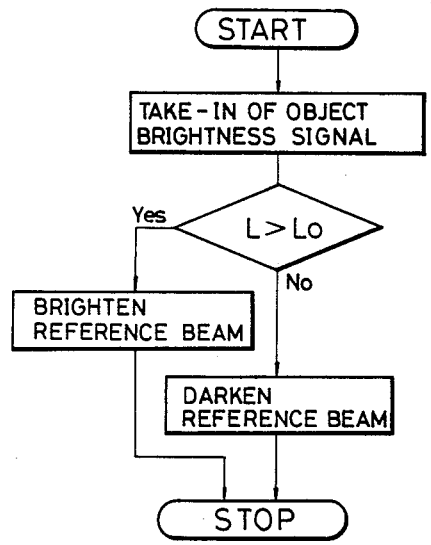

FIG. 14 is a flow chart showing an example of processing according to the present invention for varying the reference beam source 146 in accordance with the lightness of the object. In order to determine a shutter speed, the lightness L from the object's side is detected, and an output of SPD (silicone photo diode) flowing therethough a current proportionate to the lightness is taken as an output, which is turned into a brightness signal of the object. On the other hand, a reference brightness $L_o$, at which the lightness of the view field frame is to be changed over, is predetermined and stored at a voltage value thereof. This reference brightness $L_o$ is compared with the brightness L of the object, when the result of comparison is $L>L_o$, the reference beam source 146 is brightened, and, when $L<L_o$, the reference beam source 146 is darkened, so that the lightness of the view field frame 148 can be varied in accordance with the brightness of the object and the view field frame in the finder can be made readily observed.

In the foregoing description, there has been shown the case where the reference beam is changed over by only one step, however, a desirable number of change-overs may be effected as necessary.

Figure 15:
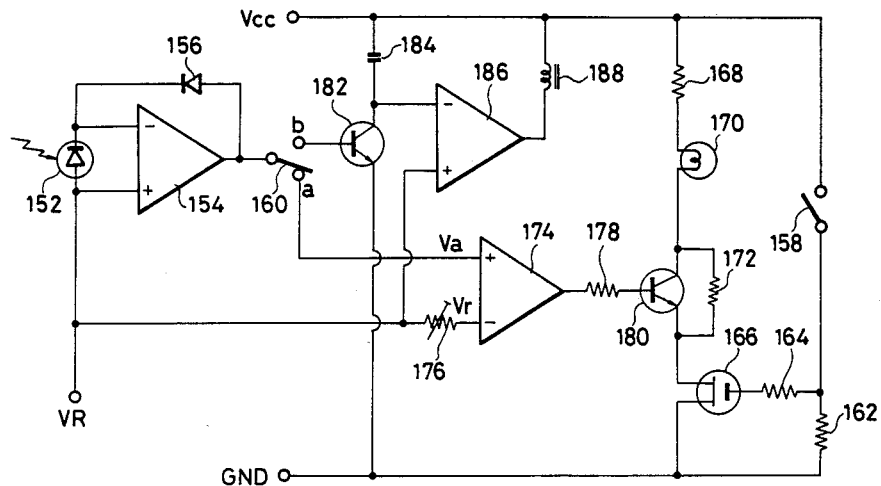

FIG. 15 shows one embodiment of the present invention in which the content of processing shown in FIG. 14 is carried out. The brightness of the object is photo-electrically transduced by a sensor 152 as being the SPD or the like for detecting a film exposure level, amplified and outputted by an amplifier 154. To enlarge a dynamic range, in the amplifier 154, a diode 156 is connected between an input and an output terminal thereof to thereby form a logarithmic compressor. On the other hand, when a hand slightly touches the shutter button, not shown, a switch 158 as being a touch sensor is closed. When the switch 158 is on, a power source voltage Vcc is supplied to a resistor 162 through the switch 158, and the voltage supplied to the resistor 162 is fed to a gate of an FET (field effect transistor) 166 through a resistor 164. A source of the FET 166 is grounded, and a drain of the FET 166 is connected in a lamp circuit in series with a current-limiting resistor 168, a lamp 170 and a current-dividing resistor 172. In consequence, turn-on of the switch 158 gives a gate voltage to the FET 166, whereby the FET 166 is turned on to pass a current to the lamp circuit, so that the lamp 170 can be lighted.

At this time, the switch 160 capable of being operated by pressing of the shutter button does not work and is positioned at a contact point a, whereby an output from the amplifier 154 is supplied to a non-inverted terminal of a comparator 174. A reference voltage Vr is supplied through a level regulating resistor 176 to an inverted terminal of the comparator 174, whereby, when an output voltage a from the amplifier 154 exceeds the voltage Vr from the inverted terminal, a voltage of a high level is outputted to the comparator 174. An output voltage from the comparator 174 is applied through a resistor 178 to the base of a transistor 180, the collector and emitter of which are connected to opposite ends of the resistor 172, whereby the transistor 180 is turned on. The transistor 180 is turned on, whereby the resistor 172 is short-circuited, so that a current passed to the lamp circuit is increased, thereby increasing a quantity of light of the lamp 170.

In consequence, the inverted terminal voltage Vr of the comparator 174 for discriminating whether $L>L_o$ as shown in FIG. 14 is set at a switching point of the view field frames, so that such a switching operation can be purely electronically effected that, when $Va<Vr$, the transistor 180 is turned off to give the lamp 170 a low brightness, and, when $Va>Vr$, the transistor 180 is turned on to give the lamp 170 a high brightness. Va is proportionate to the brightness of the object, and can automatically perform such a control that, when the brightness of the object is low, the lamp 170 is darkened to lower the brightness of the view field frame 148, and, when the brightness of the object is high, the lamp 100 is brightened to raise the brightness of the view field frame 148.

Subsequently, when the shutter button is pressed down, the switch 158 is turned off, the lamp 170 is put out to make the view field frame 158 disappear the switch 160 is changed over to a contact point b, and an output voltage from an amplifier is applied to the base of a transistor 182. The emitter of the transistor 182 is grounded, a capacitor 184 is connected to a portion between the collector and the power source, whereby a base voltage is applied, and, when this voltage is a certain level or more, the transistor 182 is turned on and the capacitor 184 is charged at a speed corresponding to a detected level of the sensor 152. When a terminal voltage of a capacitor 184 exceeds a reference voltage VR, a comparator 186 for comparing the collector voltage of the transistor 182 with the reference voltage VR comes to be on low level, whereby the comparator 186 passes a current to an electromagnet 188 for the shutter, which is connected as a load to the comparator 186, to thereby operate the shutter.

The non-inverted terminal of the comparator 174 has been connected to the output side of the switch 160, however, this may be connected to the input side. Furthermore, the example, in which the light quantity of the lamp 170 is changed by two steps, has been shown, however, the design may be readily changed such that the light quantity may be changed by a desired number of steps, or the light quantity may be continuously changed.

As has been apparent from the foregoing, according to the present invention, the reference beam for irradiating the hologram may be varied in accordance with the lightness of the object, so that the lightness of a view field frame may be varied in accordance with the brightness of the object and a clear view field frame may be obtained.

FIGS. 16 through 19 describe an example, in which, when the object exceeds an effective range of strobe light, a warning is given, by use of the camera finder according to the present invention.

Figure 16:
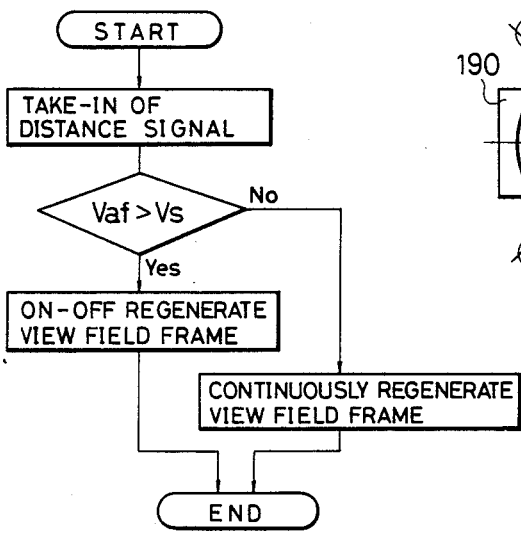
FIGS. 16 through 19 are drawings showing an embodiment in which a warning is given when the position of the object is beyond the strobe light effective range, FIG. 16 being a flow chart showing the principle of the present invention, FIG. 17 being an arrangement diagram of the finder according to this embodiment, FIG. 18 being a view of regeneration of the view field frames recorded on the hologram shown in FIG. 17 and FIG. 19 being a circuit diagram showing an embodiment of the present invention.

Prior to the description of an embodiment, the principles of the present invention will be described by a flow chart shown in FIG. 16. In an automatic focusing camera, a voltage corresponding to the object distance is generated, or, in a manual range finding camera, a voltage corresponding to an extension value of a taking lens is generated. It is judged whether or not this voltage Vaf exceeds a voltage Vs corresponding to an effective range S permitting a strobe light to reach. When Vs>Vaf, the view field frame is continuously regenerated and no warning is given to a photographer. When Vaf>Vs, it is judged that the strobe effective range is exceeded, the view field frame is on-off regenerated, and a warning of impossibility of proper photographing is given to the photographer.

Figure 17:
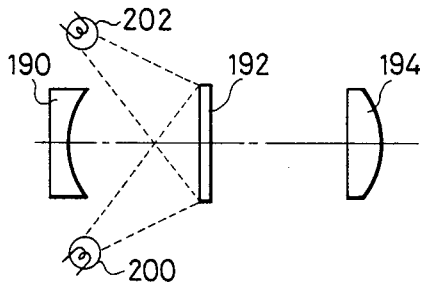
Figure 18:
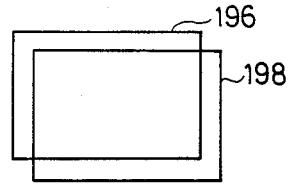

FIG. 17 shows the arrangement of the finder optical system provided with a hologram having recorded thereon view field frames. In the drawing, from the object's side, there are successively provided an objective lens 190, a hologram 192 having thereon multiple-recorded two view field frames, and an eye lens 194. As shown in FIG. 18, on the hologram 192, there are multiple-recorded a view field frame 196, in which the parallax is corrected for the medium distance and a view field frame 198, in which the parallax is corrected for the short distance (Holograms may be used per view field frame instead of multiple recording). The view field frame 196 is regenerated by a beam emitted from a reference beam source 200, and the view field frame 198 is regenerated by a beam emitted from a reference beam source 202.

Figure 19:
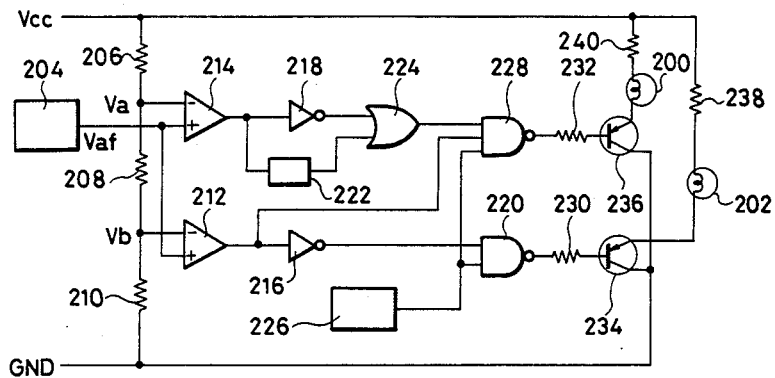

FIG. 19 shows a circuit diagram embodying the present invention, in which is shown an arrangement of a device for on-off controlling the reference beam sources 200 and 202 as shown in FIG. 17. An automatic focusing (hereinafter referred to as "AF") circuit 204 is the circuit, in which, when an AF mechanism is operated to measure a distance to the object, a voltage Vaf corresponding to the distance is generated. To turn on a reference beam source for the view field frame 216 or 218 in accordance with the object distance, resistors 206, 208 and 210 are inserted in series between a power source of the voltage Vcc and a grounding (GND), whereby the reference voltage Va (being set at a switching point between the short distance and the medium distance) and the reference voltage Vb (being set at the strobe effective limit distance) are taken out from connecting points of the respective resistors. Non-inverted terminals of the comparators 212 and 214 are connected to the output side of the AF circuit 204, an inverted terminal of the comparator 212 is connected to a reference voltage Vb output portion, and further, an inverted terminal of the comparator 214 is connected to a reference voltage Va output portion. To invert output voltages from the comparators 212 and 214, inverters 216 and 218 are connected to output terminals 212 and 214, respectively, and an output terminal of the inverter 216 is connected to one of input terminals of a NAND circuit 220. A multivibrater 222 is connected to an output terminal of the comparator 214, whereby, when the comparator 214 is on high level, the multivibrator 222 starts vibrating periodically. Connected to both output terminals of the multivibrator 222 and the inverter 218 is an OR circuit 224, and, when any of the input terminals is on high level, an output signal of high level is emitted. A gate circuit 226 generates a gate voltage in associated operation with a shutter operation or the like, and the gate voltage is applied to the NAND circuit 220 and a NAND circuit 228. When both the gate voltage and an output voltage from the inverter 216 are on high level, the NAND circuit 220 generates an output voltage of low level. The NAND circuit 228 is connected to output terminals of the comparator 212, OR circuit 224 and gate circuit 226, and, when all of the three input terminals are on high level, the output terminal of the NAND circuit 228 is on low level. Further, connected to the output terminals of the NAND circuits 220 and 228 are protective resistors 230 and 232, respectively, and further connected through these resistors to the output terminals of the NAND circuits 220 and 228 are the bases of transistors 234 and 236, both of which are of PNP type for buffer. The transistors 234 and 236 are formed with collector grounding circuits, and the reference beam sources 202 and 200 are inserted between the emitters and the power source through current-limiting resistors 238 and 240, respectively.

With the above-described arrangement, a voltage directly proportional to the distance from the object to the camera is outputted from the AF circuit 204 as the output voltage Vaf. When the voltage Vaf is in a relationship of Va>Vb>Vaf (i.e. in the short distance zone), output voltages from the comparators 212 and 214 are on low level, while, output voltages from the inverters 216 and 218 are on high level. In consequence, when a gate voltage of high level is outputted from the gate circuit 226, an output voltage from the NAND circuit 220 is turned to be on low level, whereby the transistor 234, which has caused the resistor 230 to generate a base current, is turned on to light the beam source 202, so that the view field frame 198 for the short distance is regenerated. At this time, output voltages from the OR circuit 228 and the gate circuit 226 are on high level, however, an output voltage from the comparator 212 is on low level, whereby an output voltage from the NAND circuit 228 is still on high level and the transistor 236 remains off. In consequence, the beam source 200 is not turned on, so that the view field frame 196 will not be regenerated.

Subsequently, when the voltage Vaf is increased and enters the long-medium distance zone of Va>Vaf>Vb, the comparator 212 generates an output voltage of high level to place the inverter 216 on low level. An output from the comparator 214 remains unchanged, whereby the operations of the portions up to the OR circuit 224 are the same as described above. When the inverter 216 is on low level, the NAND circuit 220 is turned to be on high level to turn off the transistor 234, whereby the beam source 202 is put out and the view field frame 198 disappears. On the other hand, since all of output voltages from the OR circuit 224, comparator 212 and gate circuit 226 are on high level, the NAND circuit 228 is turned from high level to low level, a base current is passed to the resistor 232 to turn on the transistor 236, and the beam source 200 is put on to regenerate the view field frame 196 for the long and medium distances.

When the voltage Vaf is further increased and to get to a strobe light unreaching range, where the relationship of Vaf>Va>Vb is established, both output voltages from the comparators 212 and 214 are on high level, the multivibrator 222 starts operation and the inverter 218 is turned to be on low level. As the result, a voltage of high level is applied to two of three input terminals of the NAND circuit 228 and a rectangular waveform voltage of a periodic cycle is applied to the remaining one, whereby an on-off signal of a periodic cycle is outputted to the NAND circuit 228, so that the beam source 200 is on-off operated to thereby on-off regenerate the view field frame 196. This on-off regeneration is understood as a warning of the strobe light unreaching range when the strobe light is used.

The above-described embodiment is the case where one of the view field frames is simultaneously used for the long and medium distances, however, the view field frame for the medium distance and the view field frame for the long distance may be provided separately of each other. In this case, the comparing means and beam sources may be increased in number. When three view field frames for the long, medium and short distances are provided as described above, if the on-off regeneration of the view field frame for the long distance is performed only in the use of the strobe light, then what the warning means becomes clear. On the contrary, if the correction of the parallax is neglected, then a single view field frame may be adopted, and, when the object is out of the effective range of the strobe light, this single view field frame is on-off regenerated.

In the above embodiment, description has been given of the camera provided with the AF mechanism, however, the present invention is applicable to a camera not provided with the AF mechanism. In this case, a measured distance signal should be outputted in accordance with the movement of the distance ring including a taking lens.

In the above embodiment, the hologram has been used to indicate the view field frame, however, even when the view field frame is indicated by use of a photoelectric element such as a liquid crystal, the indication of the element can be controlled to do the same thing as described above.

As has been apparent from the foregoing, according to the present application, when the object is beyond the effective range of the strobe light, the view field frame is on-off regenerated, so that the interior of the finder can be easily observed, thus improving the usability. Furthermore, there have been many cases where various warnings (the end of battery life, completion of charge of strobe light and the like) are given by the lighting of a luminescent diode in the finder of the electronic cameras in recent years, it is doubtful which warning is on in many cases. However, according to the present invention, in which the view field frame is on-off regenerated, such a possibility as described above can be eliminated.

Description will hereunder be given of the prevention of blurring of the view field frame regenerated by the halogram with reference to FIGS. 20 through 27.

Figure 20:

When a rainbow hologram 20 is irradiated by a white beam source 22 or 24 shown in FIG. 2, blurs are generated in lateral lines constituting the upper and lower end edges of the view field frame 250 as shown in FIG. 20, thus presenting a disadvantage that the upper and lower lateral lines of the view field frame 250 become unclear (Blurs are generated at end portions of the vertical lines, but are not problematical in practical use). The above-described blurs are generated due to a phenomenon of tinging the image which may be called the characteristics of the rainbow hologram. The phenomenon will be described on the bases of the steps of forming a rainbow hologram and the technique of regenerating an image as theoretically illustrated in FIG. 22A.

Prior to formation of the rainbow hologram, firstly, the general technique is performed, i.e. a master hologram is formed from a beam of the object by a laser beam and a reference beam. As shown in FIG. 22A, this master hologram 260 is disposed in parallel to a mask plate 262 formed therein with a slit 261 elongated in a direction perpendicular to the paper surface, and a laser beam 265 conjugate to the reference beam, when the master hologram was formed, is irradiated. As the result, a regenerated beam by the master hologram 260 is generated through the slit 261 and forms an image at a point a which is the position of the object when the master hologram was formed (Additionally, if the object has an area on a plane, then images of respective points thereon are formed on a vertical image-forming surface which should naturally incorporate therein the point a). If a hologram dryplate 266 is disposed in this regenerated light path, the regenerated beam from the aforesaid master hologram 260 is used as the beam of the object, and a hologram is recorded on the dryplate 266 with reference numeral 267 being used as the laser reference beam, then a rainbow hologram is obtained. In addition, the width of the slit 261 is as large as the diameter of a pupil of an eye. If the dryplate 266 is disposed at the image-forming surface of the point a, then an image hologram is obtained.

When the rainbow hologram 266 thus obtained is irradiated by a white beam source 268 as shown in FIG. 22B, a wavelength beam identical with the reference beam 267 produces a regenerated beam indicated by solid lines in FIG. 22A. When the regenerated beam is observed, an image of point a is regenerated at a point $a_1$. However, the irradiation from the white beam source 268 includes other wavelength beams of various types, whereby, due to the wavelengths thereof, regenerated beams including ones indicated by one dot chain lines and two dot chain lines are produced. This is because the diffraction by the hologram 266 depends upon the wavelengths. Parts of the regenerated beams produced by the wavelength beams are mixed in the pupil of the eye of an observer, whereby images of points $a_2$ and $a_3$ produced by the wavelength beams as well as the image of the point $a_1$ are observed. In consequence, the images of the points $a_2$ and $a_3$ are added to the image of the point $a_1$ which should originally be a single point, whereby an elongate vertical line is formed.

Figure 21:
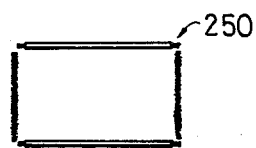
Figure 22:
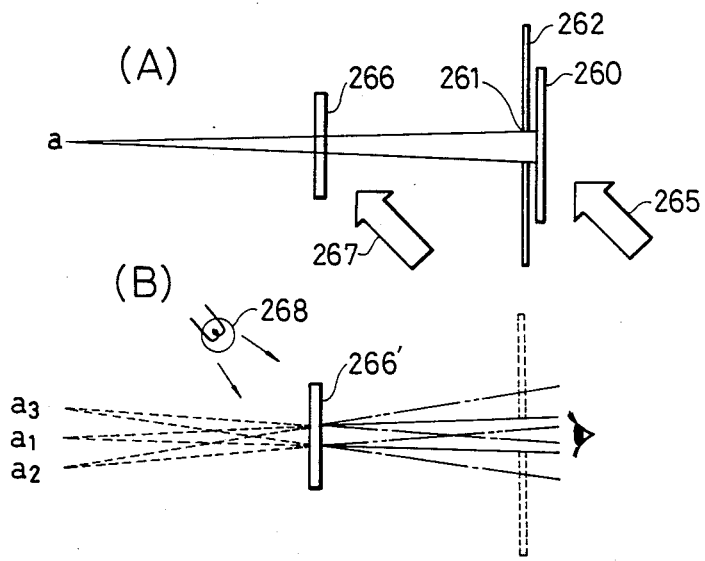
Figure 27:
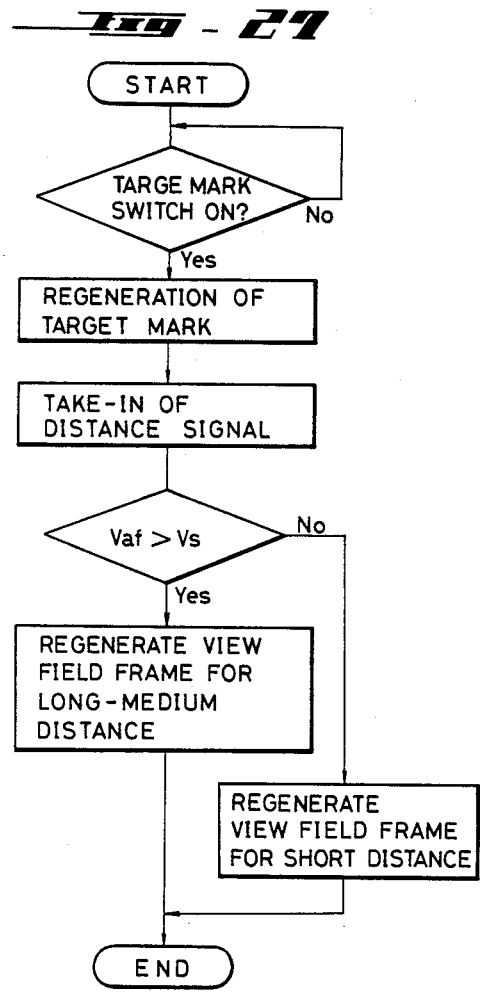
FIGS. 27 through 30 are drawings showing an embodiment in which the target mark is erased after the focus lock is effected, FIG. 27 being a flow chart showing the principle of the present invention, FIG. 28 being an arrangement diagram of the finder in which the hologram according to this embodiment is used.

The above-described phenomenon is also produced in the linear images as in the view field frame of the camera finder, which forms a so-called rectangular frame. For example, it is assumed that, in the case of forming the aforesaid rainbow hologram, a view field frame of a camera finder, in which four lines are combined in a rectangular shape, is recorded on a hologram to obtain a master hologram, on the basis of which a rainbow hologram is produced by use of the technique shown in FIG. 22A. When an image regeneration is made from the rainbow hologram thus obtained as shown in FIG. 22B, the image of the view field frame is observed along with blurs for the aforesaid reason. However, as apparent from FIG. 22B, these blurs are disposed at the upper and lower end edge in the drawing, the blurs are notably generated in the lateral lines at the upper and lower portions of the view field frame, whereas, the directions of generation of blurs coincide with the vertical lines of the view field frame, whereby the blurs are not notable. In other words, the image of the view field frame is regenerated as shown in FIG. 20. Unless the rainbow hologram formed by use of the technique shown in FIG. 22A is irradiated in a direction opposite to the reference beam 267, no image is regenerated. In consequence, if this rainbow hologram is disposed at a position shown in FIG. 2 for example, and regenerating beam sources are disposed at the right and left positions in front of the hologram 20 (in the direction perpendicular to the paper surface) for regeneration, no regenerated image can be obtained. However, even in these positions of the regenerating beam sources, if the hologram 20 is rotated through 90°, the blurs are generated in the vertical lines of the view field frame as shown in FIG. 21 for the aforesaid reason.

The present invention has been developed to obviate the above-described disadvantages of the prior art by using a hologram for indicating the view field frame of a camera finder, whereby the generation of blurs of a regenerated image is controlled to thereby obtain a satisfactory view field frame.

To this end, the present invention contemplates that, based on the fact that the generation of blurs due to color dispersion at the time of regenerating the rainbow hologram has a directional property, a hologram recording for the regeneration of the vertical lines of the view field frame and a hologram recording for the regeneration of the lateral lines of the view field frame are carried out in two steps in consideration of the aforesaid directional property in forming the rainbow hologram, and images are regenerated by regenerating beam sources separate of each other, whereby an image of the view field frame is obtained by the composition of the above regenerated images.

Detailed description will hereunder be given of one embodiment of the present invention with reference to the drawings.

FIG. 23 illustrates the steps of forming a master hologram required for forming a rainbow hologram used in the present invention. Firstly, as shown in FIG. 23A, a mask plate formed with laterally elongate slits for forming the lateral lines of the view field frame is superposed on a diffusion plate such for example as a frosted glass to thereby obtain a lateral line object 270. When irradiated by a laser beam 271, the slit-like lateral line object 270 generates a diffused beam, which is referred to an object beam. When an interference wavelength between this object beam and the reference beam 273 is recorded on a hologram dryplate 272, a lateral line master hologram 274 can be obtained. Furthermore, a vertical line master hologram 275 is obtained by use of the technique similar to the above as shown in FIG. 23B. Upon obtaining the lateral and vertical line master holograms 274 and 275 as described above, a rainbow hologram is formed on the basis of these master holograms, and the technique is illustrated in FIGS. 24A and 24B. More specifically, firstly, the lateral line master hologram 274 is superposed thereon with a mask 280 formed with a vertical line slit 281, and irradiated by a laser beam indicated at 285 in the drawing (laser beam conjugate to the reference beam 273). As the result, an image of a diffracted beam from the master hologram 274 as being an object beam is formed on an image-forming surface incorporating therein a point m. Additionally, in this case, the distance from the master hologram 274 to the point m is equal to the distance from the diffusion plate formed with the slits 270 to the hologram dryplate 272 as shown in FIG. 23A. When a hologram dryplate is disposed anew in this object beam path and exposed to a laser reference beam 292, a rainbow hologram 290 for regenerating the lateral line image of the view field frame can be obtained. In this case, it is necessary to set the direction of irradiation of the reference beam 292 in parallel to the linear direction of the slit 281. Furthermore, the position of providing the hologram dryplate 286 may be theoretically anywhere so far as the dryplate is disposed between the lateral line master hologram 274 and the point m, however, the position may be determined in accordance with such other matters of design as the position in the finder optical system in which the obtained rainbow hologram is to be disposed, or in what position of eyesight an image is to be regenerated in consideration of the power of the eye piece of the finder.

The thus obtained rainbow hologram 290 for regenerating the lateral line image of the view field frame is multiple-exposed by use of the vertical line master hologram 275 formed as shown in FIG. 23. More specifically, as shown in FIG. 24, the vertical line master hologram 275 is superposed on a mask 295 and irradiated by the laser beam 285. Then, the aforesaid rainbow hologram 290 is disposed again in the diffracted beam path from this vertical line master hologram 275, and irradiated by the reference beam 297 in a direction parallel to the linear direction of the slit as aforesaid, whereby the hologram 290' is formed as a double exposure rainbow hologram 290.

In the above-described forming technique, two slit masks may be replaced by one slit mask which is rotatable through 90°, and moreover, when the regenerated frame image is of approximately square shape, the lateral line object 270 formed with the lateral line slit may be rotated through 90° to be used as the vertical line object.

In the use of the double exposure rainbow hologram 290 thus formed, in FIG. 24, if a white beam opposite in direction to the reference beam 292 irradiates the hologram 290 from the left side thereof, then the lateral line image of the view field frame with no blurs is regenerated. If a white beam opposite in direction to the reference beam 297 irradiates the hologram 290 from the left side thereof, then the vertical line image of the view field frame with no blurs is regenerated. In consequence, when these white beams irradiate simultaneously, a rectangular view field frame with no blurs can be regenerated.

FIG. 25 is an arrangement diagram of the finder optical system utilizing the above-described double exposure rainbow hologram 290, in which the rainbow hologram 290 is interposed between an objective lens 301 and an eye piece 302. White beam sources for regeneration 304 and 306 are provided out of the finder light path, in consideration of angles of the reference beams at the time of forming the rainbow hologram, whereby the lateral line image of the view field frame is regenerated by a beam source 304, and the vertical line image of the view field frame is regenerated by a beam source 306.

FIG. 26 shows another example of the multiple exposure rainbow hologram to which the present invention is applied. In this example, a rainbow hologram 310 is subjected to quadruple exposure. Through the utilization of four white beam sources 311, 312, 313 and 314 disposed above, below, at the right and left sides, and in front of the hologram 310, images are regenerated. In the drawing, the images regenerated by the lighting of four beam sources are imitatably indicated by broken lines and one dot chain lines. More specifically, beams diffracted by the hologram 310 through the lighting of the beam sources are directed rightwardly, and the diffracted beams reach a naked eye through an eye piece, not shown. In this case, the position of a virtual image observed by the naked eye can be adjusted to a suitable eyesight position only if the conditions such as the power of eye piece and hologram recording are considered.

In the embodiment shown in FIG. 26, the lateral line image 321 of the view field frame is regenerated by the lighting of the beam source 311, the vertical line image 322 of the view field frame is regenerated by the lighting of the beam source 312, and these images are observed as the images of the view field frames with no blurs for the aforesaid reason. Further, if the beam source 311 and 312 are put out and the beam sources 313 and 314 are put on, then a second lateral line image 323 of the view field frame and a second vertical line image 324 of the view field frame can be regenerated. In order to form of the above-described hologram 320, the technique shown in FIGS. 23 and 24 should be repeated twice with the reference beams 292 and 297 being changed in the irradiating direction. If this quadruple exposure rainbow hologram is used, then the view field frames different from one another can be selected and indicated in one and the same finder optical system depending upon the application and purposes, and hence, the quadruple exposure rainbow hologram can be utilized for the indication of the finder parallax correction and the indication of the range of angle of view for each taking lens. In addition, the positions of the respective regenerating beam sources 311 through 314 in relation to the hologram 310 should naturally be limited by the irradiating directions of the reference beams at the time of forming the hologram. However, it is desirable to disposed the respective regenerating beam sources at positions close to a vertical surface or a horizontal surface incorporating therein the finder optical axis from the view point of the constitution of the finder unit or the clearness of the regenerated image, and the same is true of the embodiment shown in FIG. 25. Because the hologram is disposed in the finder light path, it is preferable to use the phase type or volume type hologram having a high transmittivity.

As has been described hereinabove, according to the present invention, when the image of the view field frame of the finder is obtained as a regenerated image from the rainbow hologram, there is used a multiple exposure rainbow hologram in which the lateral lines and the vertical lines, both of which constitute the view field frame are recorded separately of one another, and the rainbow hologram is regenerated by these regenerating beam sources separate of one another, so that there may be controlled the blurs of the images due to the color dispersion, which has been observed in the regenerated image from the conventional rainbow hologram, thus proving to be highly advantageous. Needless to say, as the hologram used in the present invention, there may be used not only the hologram, which has been subjected to the multiple exposure recording process, but also a transfer hologram obtained by pressforming the above-described hologram.

FIGS. 27 through 30 described one embodiment in which a target mark is erased after the focus lock of the camera finder according to the present invention. Description will now be given of the outline of this embodiment with reference to a flow chart shown in FIG. 27. A target mark is regenerated during the on-operation of a switch being turned on by the removal of a lens cover from the camera, a switch for only the target mark indication, which is provided on the camera body, a switch being turned on by merely touching on a shutter button or the like. In this state, the camera is focus locked to erase the target mark, the distance signal voltage Vaf proportional to the measured distance at this time is taken in, and compared with the reference voltage Vs corresponding to the distance where the view field frame is to be switched, whereby, when Vaf>Vs, the view field frame for the long-medium distance is regenerated, and, when Vaf<Vs, the view field frame for the short distance is regenerated. In addition, here, there is shown the example in which two view field frames are provided, but, a single view field frame may be adopted.

Figure 28:
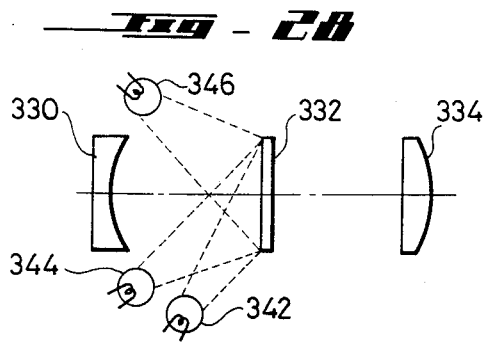
Figure 29:
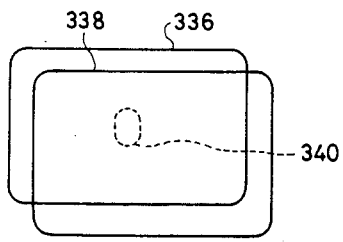

FIG. 28 illustrates the arrangement of the finder in which the hologram according to the present invention is used. In looking from the object, there are successively disposed an objective lens 330 constituting the finder optical system, and a hologram 332 in which two view field frames are multiple recorded. As shown in FIG. 29, in the hologram 332, there are multiple-recorded a view field frame 336, in which the parallax is corrected for the long-medium distance, a view field frame 338, in which the parallax is corrected for the short distance, and further, an auto-focus target mark 340 for indicating the range finding zone for the automatic focusing, which is disposed at the central portion of the view field frame 336 (a plurality of holograms may be used for every view field frame without using the multiple recording). The view field frame 336 is regenerated by an irradiating beam of the reference beam source 342, the view field frame 338 is regenerated by an irradiating beam of the reference beam source 344, and the target mark 340 is regenerated by an irradiating beam of the reference beam source 346, respectively.

Figure 30:
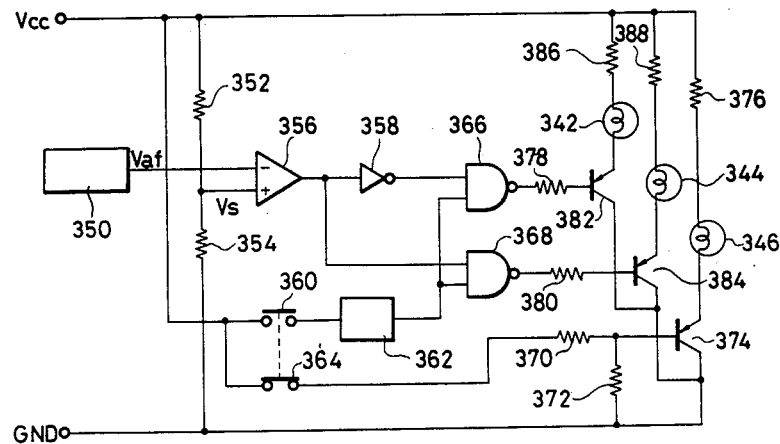

FIG. 30 is a circuit diagram showing one embodiment of the present invention, which is an example of arrangement of a device for on-off controlling the reference beam sources 342, 344 and 346 as shown in FIG. 28.

To set the reference voltage Vs, a voltage dividing circuit, in which resistors 352 and 354 are provided in series, is inserted between the power source (Vcc) and the grounding (GND). A non-inverted terminal of a comparator 356 is connected to a connecting point between the resistors 352 and 354, and an inverted terminal of the comparator 356 is connected to an output terminal of an AF circuit 350. The AF circuit 350 has a function of generating the voltage Vaf corresponding to the distance when the AF mechanism is operated to measure the distance to the object. Connected to an output terminal of the comparator 356 is an inverter 358 for invertedly outputting an output voltage of the comparator 356. When the shutter button is half-pressed or a focus lock button for the specialized use is pressed, the focus lock is effected, a switch 360 to be turned on in associated operation of this focus lock is connected to the power source, and further, the switch 360 is connected thereto with a one shot multivibrator 362 for outputting a voltage of high level for a predetermined period of time (for example, a few seconds). Furthermore, the power source is connected thereto with a switch 364, in which, when the shutter button is touched, an electronic circuit is operated to turn on the switch, and, when the focus lock is effected, the switch is turned off. Connected to the respective output terminals of the inverter 358 and the one shot multivibrator 362 are the respective ones of two input terminals of a NAND circuits 366, and, when the two input terminals are simultaneously on high level, voltages at the output terminals are on low level. Connected to the respective output terminals of the comparator 356 and the one shot multivibrator 362 are the respective ones of two input terminals of a NAND circuit 368, and, when the two input terminals are simultaneously on high level, voltages at the output terminals are on low level. On the other hand, a bias setting circuit, in which resistors 370 and 372 are provided in series, is inserted between the switch 364 and the grounding, the base of a transistor 374 is connected to a connecting point between the both resistors, and the reference beam source 346 is inserted through a current-limiting resistor 376 between the emitter of the transistor 374, in which an emitter follower circuit is formed, and the power source. Similarly, resistors 378 and 380 for the base bias are connected to respective output terminals of the both NAND circuits 366 and 368, and the respective resistors 378 and 380 are connected thereto with the base of a transistor 382 and the base of a transistor 384. The transistors 382 and 384 are formed with emitter follower circuits, respectively, and the reference beam sources 342 and 344 are inserted between the emitters and the power source through respective current-limiting resistors 386 and 388.

With the above arrangement, until the operation of the shutter is performed, the AF mechanism keeps the taking lens at the end of the short distance's side (or at the end of the long distance's side), and an output voltage of the AC circuit 350 is on low level (or on high level). When the shutter button, not shown, is slightly touched by a finger with the finder being looked in, the switch 364 is turned on, a bias current is passed through the base bias setting circuit including the resistors 370 and 372, the transistor 374 is turned on, and the reference beam source 346 is put on through the current-limiting resistor 376, whereby the target mark 340 is regenerated.

Subsequently, when the shutter button is operated to a certain stroke position with the target mark being put together with the object, the AF mechanism is operated, whereby the taking lens is moved to the focus adjusted position in accordance with the measured distance. Then, when the shutter button is half-pressed with the target mark 340 being superposed on the desirable focus adjusted zone of the object, the switch 360 is turned on, and the focus lock is effected. When the target mark 340 is shifted off the desired object in looking from the composition, the target mark 340 is temporarily put together with the desired object and the focus lock is effected thereat, and then, the shutter button should be pressed at once with the camera being held so that the desired composition may be obtained. At the same time as the switch 360 is turned on and the focus lock is effected, the switch 364 is turned off in associated operation with the switch 360, whereby the transistor 364 is turned off, the reference beam source 346 is put out, and the target mark 340 disappears.

The operation of the AF mechanism causes the voltage Vaf proportional to the measured distance to the object to be outputted, and the voltage Vaf is compared with the reference voltage Vs in the comparator 356. The content of comparison made by the comparator 356 will be divided into the following two cases.

(i) When Vaf>Vs

This is the case where the object is located in the long-medium distance, in which case an output voltage from the comparator 356 is on low level, an output voltage from the inverter 358 is on high level, the switch 360 is on, and the one shot multivibrator 362 generates an output voltage of high level. In consequence, a NAND condition is fulfilled in the NAND circuit 366, while, a NAND condition is not fulfilled in the NAND circuit 368, whereby a voltage at the output terminal of the NAND circuit 366 is on low level, while, a voltage at the output terminal of the NAND circuit 368 is on high level, so that the transistor 382 is turned on, the reference beam source 342 is put on, and the view field frame 336 is regenerated. At this time, the transistor 384 is off, the reference beam source 344 is out, and the view field frame 338 is not regenerated. On the other hand, since the switch 364 is off, the transistor 374 is off, whereby the target mark 340 is not regenerated.

(ii) When Vaf<Vs

This is the case where the object is located in the short distance, in which case a voltage at the output terminal of the comparator 356 is on high level, a voltage at the output terminal of the inverter 358 is on low level and a voltage at the output terminal of the one shot multivibrator 362 is on high level, whereby a NAND condition is not fulfilled in the NAND circuit 366, while, a NAND condition is fulfilled in the NAND circuit 368. In consequence, the transistor 382 is turned off and the reference beam source 342 is put out, while, the transistor 384 is turned on and the reference beam source 344 is put on, and the view field frame 338 is regenerated at the same time as the view field frame 336 disappears. Since the switch 364 remains off at this time, the transistor 374 remains off and the target mark does not reappear.

As is apparent from the foregoing, according to the present invention, until the focus lock is effected, the target mark is indicated, while, after the focus lock is effected, the target mark disappears, so that the interior of the finder can be easily observed, thus improving the usability.

Moreover, according to the present invention, until the focus lock is effected, the view field frame is not regenerated, while, only after the focus lock is effected, the view field frame is indicated, so that only necessary data can be indicated, thus improving the usability of the finder.

Figure 31:
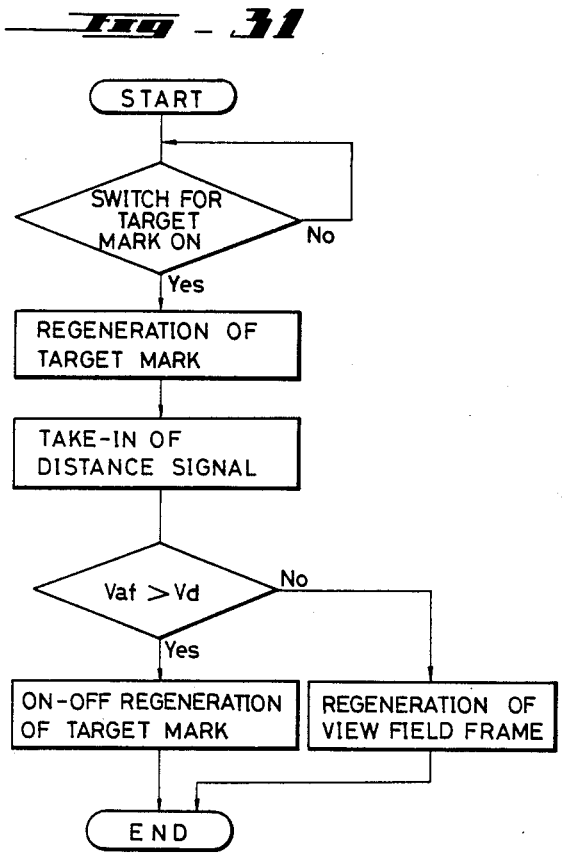
FIGS. 31 through 32 are drawings showing an embodiment, in which a warning is given when the object is located at a position closer than the shortest focal length of the camera, FIG. 31 being a flow chart illustrating the principle of the present invention, and FIG. 32 being a circuit diagram showing an embodiment of the present invention.
Figure 32:
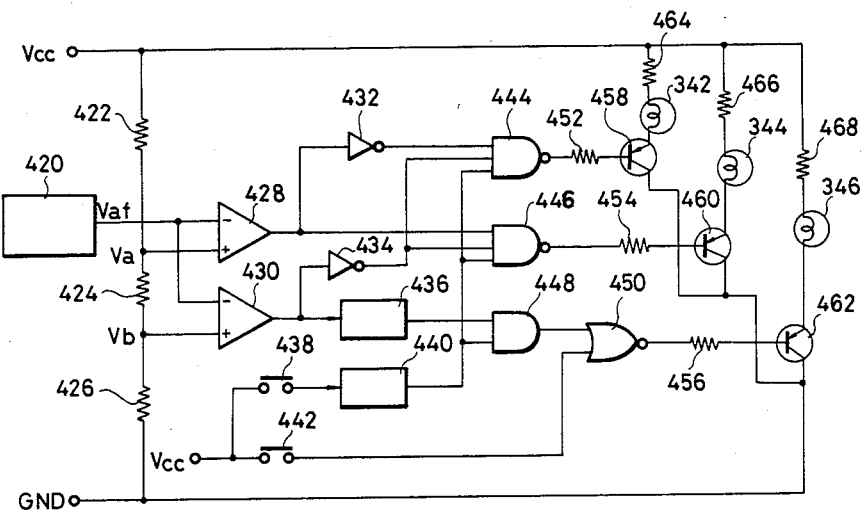

FIGS. 31 and 32 illustrate one embodiment of the warning of the short distance of the camera finder according to the present invention. Description will now be given of the outline of this embodiment with the reference to a flow chart shown in FIG. 31. The target mark is continuously regenerated during the on-operation of a switch being turned by the removal of a lens cover from the camera, a switch for only the target mark indication, which is provided on the camera body, a switch being turned on by merely touching on a shutter button or the like. In this state, the shutter button is pressed down to operate the AF mechanism, the distance signal voltage Vaf proportional to the measured distance is taken in, judgment is made whether or not the voltage Vaf exceeds a voltage Vd corresponding to a focus adjustable shortest takable distance D, and, when Vaf<Vd, the view field frame is regenerated, however, when Vaf>Vd, the target mark is on-off operated to give warning, judging the object is located closer to the camera than the shortest takable distance.

FIG. 32 is a circuit diagram showing one embodiment of the warning of the short distance, which is an example of arrangement of a device for putting on or out of the reference beam sources 342 and 344, and lighting and on-off controlling the reference beam source 346, all of the reference beam sources being shown in FIG. 28.

To obtain reference voltages Va and Vb preset in accordance with the measured distances, a circuit, in which resistors 422, 424 and 426 are provided in series, is inserted between the power source (Vcc) and the grounding (GND). A non-inverted terminal of a comparator 428 is connected to a connecting point between the resistor 422 for outputting the reference voltage Va and the resistor 424, and an inverted terminal of the comparator 428 is connected to an output terminal of the AF circuit 420. When the AF mechanism is operated to measure a distance to the object, the AF circuit 420 generates the voltage Vaf corresponding to the measured distance. A non-inverted terminal of a comparator 430 is connected to a connecting point between the resistor 424 for outputting the reference voltage Vb and the resistor 426, and an inverted terminal of the comparator 430 is connected to an output terminal of the AF circuit 420. Connected to the comparators 428 and 430 are inverters 432 and 434 for inverting and outputting output voltages from output terminals of the comparators 432 and 434, respectively.

Connected to an output terminal of the comparator 430 is a multivibrator 436 adapted to start vibrating at a predetermined cycle (for example, 0.5 sec) when an output voltage at the output terminal of the comparator 430 is on high level. On the other hand, when the shutter button is half-pressed (or a focus lock button for the specialized use is pressed), the focus lock is effected, a switch 438 being turned on in associated operation with this focus lock is connected to the power source, and further, the switch 438 is connected thereto with a one shot multivibrator 440 adapted to output a voltage of high level for a predetermined period of time (a few sec) when the switch 438 is on. Furthermore, the power source is connected thereto with a switch 442 adapted to be turned on through the operation of an electronic circuit when the shutter button is touched and to be turned off at the time of focus lock. Three input terminals of a NAND circuit 444 are connected to output terminals of the inverters 432, 434 and the one shot multivibrator 440, respectively, and, when the three input terminals are simultaneously on high level, voltages at the aforesaid output terminals are on low level. Three input terminals of a NAND circuit 446 are connected to output terminals of the comparator 428, the inverter 434 and the one shot multivibrator 440, respectively, and, when the three input terminals are simultaneously on high level, voltages of the aforesaid output terminals are on low level. Two input terminals of an AND circuit 448 are connected to output terminals of the multivibrator 436 and the one shot multivibrator 440, respectively, and, when the two input terminals are simultaneously on high level, voltages at the aforesaid output terminal are on high level. Two input terminals of a NOR circuit 450 are connected to output terminals of the switch 442 and the AND circuit 448, respectively, and, when any one of the two input terminals is on high level, voltages at the aforesaid output terminals are on low level. Base resistors 452, 454 and 456 are connected to the NAND circuits 444, 446 and the NOR circuit 450, respectively, and output ends of the respective resistors are connected thereto with the bases of the transistors 458, 460 and 462. The respective transistors are of PNP type, in each of which a collector grounding circuit is formed. The reference beam source 342 for the long-medium view field frame, the reference beam source 344 for the short distance view field frame and the reference beam source 346 for the target mark are inserted between the emitters of the transistors 458, 460 and 462 and the power source through current-limiting resistors 464, 466 and 468, respectively.

With the above-described arrangement, as the output voltage Vaf from the AF circuit 420, a voltage directly proportional to the distance from the object to the camera is outputted. When the shutter button, not shown, is slightly touched by a finger with the finder being looked in, the switch 442 is turned on, a voltage at the output terminal of the NOR circuit 450 is turned from high level to low level, and current is passed through the base resistance 456 to turn the transistor 462 on. As the result, the beam source 346 is put on through the current-limiting resistor 468, whereby the target mark 340 is regenerated. Subsequently, when the shutter button is pressed down, the AF mechanism is operated, whereby the taking lens is moved to the desired focus adjusted position in accordance with the measured distance. Then, when the shutter button is half-pressed so that the target mark 340 can be put together with the desired focus adjusted area of the object, the switch 438 is turned on, whereby the focus lock is effected. When the finder is looked in to find the target mark 340 is shifted off the desired object in looking from the composition, the target mark 340 is temporarily put together with the desired object and focus-locked thereat, and then, the shutter button should be pressed at once with the camera being held so that the desired composition may be obtained. In the state where the focus lock is effected as described above, a predetermined portion of the object is focus-adjusted in the pre-operation conditions of the shutter, which conditions are maintained until the shutter is pressed down.

When the AF mechanism is operated, the voltage Vaf proportional to the measured distance to the object is being outputted, and this voltage Vaf is compared with the reference voltages Va and Vb in the comparators 428 and 430, respectively. The contents of comparison made by the comparators 428 and 430 will be divided into the three following cases. Additionally, the switch 442 is off while the focus lock functions, whereby the target mark is not continuously regenerated.

(i) $Vaf > Va > Vb$

This is the case where the object is located in the long-medium distance, in which case the voltages at the output terminals of the comparators 428 and 430 are on low level, the voltages at the output terminals of the inverters 432 and 434 are on high level, and the switch 438 is turned on due to the focus lock and the one shot multivibrator 440 outputs an output voltage of high level, whereby a NAND condition is fulfilled in the NAND circuit 444, and output voltage therefrom is on low level to turn on the transistor 458, so that the beam source 342 is put on to regnerate the view field frame 336 for the long-medium distance. At this time, an output voltage from the comparator 428 is on low level, whereby a NAND condition is not fulfilled in the NAND circuit 446, so that the transistor 460 remains off not to put on the beam source 344. In consequence, the view field frame 338 for the short distance is not regenerated. Furthermore, since an output voltage from the omparator 430 is on low level, the multivibrator 436 is in non-operation, whereby an AND condition is not fulfilled in the AND circuit 448. Further, the switch 442 is turned off at the time of focus lock, whereby an output voltage from the NOR circuit 450 is on high level. Since the transistor 462 is off, the beam source 346 is not put on. In consequence, the target mark 340 is not regenerated.

(ii) When Va>Vaf>Vb

This is the case where the object is located in the short distance, in which case the operation of the comparator 430 remains the same as in (i) above, however, the output voltage from the comparator 428 is turned to be on high level because of Vaf<Va. In consequence, the output voltage from the inverter 432 is turned to be on low level, the NAND condition is not fulfilled in the NAND circuit 444, the output voltage therefrom is turned to be on high level, and the beam source 342 is put out. On the other hand, since the output voltage from the comparator 428 is turned to be on high level as described above, the NAND condition is fulfilled in the NAND circuit 446, the output voltage therefrom is turned to be on low level to turn on the transistor 460, whereby the beam source 344 is put on to regenerate the view field frame 338. Since the output voltage from the NOR circuit 450 is still on high level, the beam source 346 remains put out, whereby the target mark 340 is not regenerated, and after all, only the view field frame 338 is regenerated.

(iii) When Va>Vb>Vaf

This is the case where the object is located at a position closer to the camera than the shortest takable distance, in which case the operation of the comparator 428 remains the same as in (ii) above, however, the output voltage from the comparator 430 is turned to be on high level because of Vaf<Vb. For this reason, the output voltage from the inverter 434 is turned to be on low level, whereby the NAND condition is not fulfilled in the NAND circuit 446, so that the transistor 460 is turned off to put out the beam source 344 and the view field frame 338 disappears. On the other hand, the output voltage from the comparator 430 is turned to be on high level, whereby the multivibrator 436 starts vibrating, whereby an intermittent voltage of a predetermined cycle is applied to the AND circuit 448, so that an output voltage of high level of the one shot multivibrator 440 can be applied to the AND circuit 448 at the time of the focus lock. As the result, the AND condition is fulfilled in the AND circuit 448, whereby the output voltage from the AND circuit 448 is turned to be on high level. The NOR circuit 450 generates an output voltage obtained by inverting an output voltage from the AND circuit 448, intermittently passes a base current to the transistor 462 to cause the transistor 462 to perform a flash operation, and on-off operates the beam source 346, whereby the target mark 340 is on-off regenerated. Since the beam sources 342 and 344 are put out at this time, no view field frame is regenerated, and only the target mark is on-off regenerated. A photographer may learn that the object is located at a position closer to the camera than the shortest takable distance through the on-off regeneration of the target mark 340. The photographer may obtain an in-focus picture by changing the distance from the object to the camera to one where the target mark 340 is not on-off regenerated, thus preventing the waste of film.

As has been apparent from the foregoing, according to the present invention, when the object is located at a position closer to the camera than the shortest takable distance, the target mark is on-off regenerated to give a warning, so that out-of-focus pictures are not taken, thereby preventing the waste of film.

What is claimed is:

1. In a camera comprising a camera body and a camera lens, said lens having a distance ring disposed thereon for focusing said lens, a camera finder comprising:
    a finder optical system; a hologram provided in said finder optical system and having therein multiple-recorded at least two view field frames each corresponding to an object distance;
    means for generating a plurality of reference beams; and
    means for selecting one of said plurality of reference beams in accordance with the object distance, whereby one of said view field frames corresponding to the object distance is regenerated.

2. A camera finder as set forth in claim 1, wherein said generating means comprises at least two beam sources, and one of the beam sources is selected in accordance with the object distance to regenerate the view field frame.

3. A camera finder as set forth in claim 2, wherein said at least two view field frames include a view field frame, in which a parallax is corrected on the side of long and medium distance, and a view field frame, in which a parallax is corrected on the side of short distance.

4. A camera finder as set forth in claim 3, wherein said selecting means comprises means for performing the exchange of a beam source for regenerating a view field frame, in which the parallax is corrected on the side of long-medium distance, and a beam source for regenerating a view field frame, in which the parallax is corrected on the side of short distance, said exchange being performed in operational association with movement of said distance ring.

5. A camera finder as set forth in claim 1, wherein said generating means comprises a single beam source, and means for moving said single beam source, whereby different ones of said plurality of reference beams are generated by moving said single beam source.

6. A camera finder as set forth in claim 1, wherein said finder optical system is an inverted Galilean finder.

7. A camera finder as set forth in claim 1, wherein said finder optical system is an Albada finder.

8. A camera finder comprising:
    a finder optical system;
    a plurality of holograms provided in said finder optical system, each of said plurality of holograms having recorded therein at least two view field frames, each of said at least two view field frames corresponding to an object distance;
    means for generating a plurality of reference beams; and
    means for selecting one of said plurality of reference beams in accordance with an object distance, whereby one of said at least two view field frames corresponding to the object distance is regenerated.

9. A camera finder as set forth in claim 8, wherein said finder optical system is an inverted Galilean finder.

10. A camera finder as set forth in claim 8, wherein said finder optical system is an Albada finder.

11. In a camera comprising a camera body and a plurality of interchangeable lenses, one of said interchangeable lenses being selected in accordance with a desired photographic effect, a camera finder comprising:
    a finder optical system;

a hologram provided in said finder optical system and having multiple-recorded therein at least two view field frames, each of said at least two view field frames corresponding to focal lengths of the interchangeable lenses;

means for generating a plurality of reference beams; and means or selecting one of said plurality of reference beams in accordance with a focal length of one of the interchangeable lenses, whereby one of said at least two view field frames corresponding to a focal length of said one of interchangeable lenses is regenerated.

12. A camera finder as set forth in claim 11, wherein said finder optical system is an inverted Galilean finder.

13. A camera finder is set forth in claim 11, wherein said finder optical system is an Albada finder.

14. In a camera comprising a camera body and a plurality of interchangeable lenses, one of said interchangeable lenses being selected in accordance with a desired photographic effect, a camera finder comprising:

a finder optical system; a plurality of holograms provided in said finder optical system and each having recorded therein a view finder optical system and each having recorded therein a view field frame each corresponding to focal lengths of the interchangeable lenses;

means for generating a plurality of reference beams; and means for selecting one of said plurality of reference beams in accordance with a focal length of one of the interchangeable lenses, whereby one of said at least two view field frames corresponding to a focal length of said one of interchangeable lenses is regenerated.

15. A camera finder as set forth in claim 14, wherein said finder optical system is an inverted Galilean finder.

16. A camera finder as set forth in claim 14, wherein said finder optical system is an Albada finder.

17. A camera finder comprising:

an objective lens; an eye lens; a rainbow hologram interposed between said objective lens and said eye lens, said rainbow hologram being a multiple-recorded hologram incorporating therein a recording for regenerating images of vertical lines of at least one view field frame and a recording for regenerating images of lateral lines of said at least one view field frame; and a plurality of regenerating white beam sources for regenerating said view field frame, said images of vertical lines and said images of lateral lines of said at least one view field frame being regenerated by irradiations from respective ones of said regenerating white beam sources.

18. A camera finder as set forth in claim 17, wherein said rainbow hologram is a multiple-recorded hologram incorporating therein a plurality of recordings for regenerating images of vertical and lateral lines of at least two view field frames, wherein respective ones of said plurality of regenerating white beam sources regenerate images of vertical lines and images of lateral lines of respective ones of said at least two view field frames.

* * * * *